(12) United States Patent
Suzuki et al.

(10) Patent No.: US 6,234,271 B1
(45) Date of Patent: *May 22, 2001

(54) POWER STEERING DEVICE

(75) Inventors: Katsuhiro Suzuki; Shinichi Hagidaira; Yoshiyuki Tsukada, all of Kani (JP)

(73) Assignee: Kayaba Industry Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,664

(22) Filed: Oct. 20, 1997

(30) Foreign Application Priority Data

Mar. 5, 1997 (JP) .................................... 9-067457
Jun. 4, 1997 (JP) .................................... 9-161903

(51) Int. Cl.$^7$ .................................... B62D 5/083
(52) U.S. Cl. .......................... 180/441; 91/375 A
(58) Field of Search .................... 180/426, 425, 180/444, 441, 428, 400; 267/273, 277; 74/388 PS; 91/375 A (56) References Cited

U.S. PATENT DOCUMENTS

| | | | |
|---|---|---|---|
| 3,296,939 | * | 1/1967 | Eddy .................. 74/388 PS |
| 5,233,906 | * | 8/1993 | Bishop et al. ............ 180/441 |
| 5,241,893 | * | 9/1993 | Guasch et al. ........... 180/441 |
| 5,871,064 | * | 2/1999 | Suzuki et al. ........... 180/444 |

* cited by examiner

Primary Examiner—Anne Marie Boehler
(74) Attorney, Agent, or Firm—Steinberg & Raskin, P.C.

(57) ABSTRACT

It is an object of the invention to achieve both of centering of an input shaft and an output shaft to determine relative positions of the same in a neutral state and the centering of a mechanism for applying a preset force.

In order to achieve the object, in a power steering device having a configuration wherein an assistant force is provided in accordance with the amount of relative rotation of an input shaft 4 and an output shaft 5 connected by a torsion bar 5; a spring containing chamber 9 that rotates integrally with the output shaft 2 is provided; and a preset force is provided by the spring force a pair of spring members 13 provided such that they sandwich the input shaft 4 on both sides thereof in the spring containing chamber 9, there is provided a spring receiving ring 25 which is a member separate from the output shaft 2 or a member that rotates integrally with the output shaft 2; a spring containing chamber 9 and at least one insertion hole 27, 28, 32, 33 in the ring receiving ring 25; securing members 23, 26, 30, 31 inserted in the insertion holes 27, 28, 32, 33 for positioning and securing the spring receiving ring 25 to the output shaft 2 or the member that rotates integrally with the output shaft 2; and a fine adjustment means between the securing members 23, 26, 30, 31 and the insertion holes 27, 28, 32, 33 for allowing fine adjustment of the position of the spring receiving ring 25 relative to the output shaft 2 or the member that rotates integrally with the output shaft 2.

2 Claims, 10 Drawing Sheets

POWER STEERING DEVICE

BACKGROUND OF THE INVENTION

1. Field of the Invention

The present invention relates to a power steering device utilizing a torsion bar.

2. Description of the Prior Art

When a power steering device utilizing a torsion bar is used, one factor that is felt as a response by the driver at the steering wheel is the torsional resistance of the torsion bar. However, when the steering is in a neutral position, there is almost no torsional resistance of the torsion bar, which results in weaker rigidity of neutrality and hence reduces the stability of the vehicle during a straight travel.

Under such circumstances, various devices have been proposed to provide a preset force to achieve rigidity of neutrality. By way of example, one of such devices will be described below.

FIGS. 9 through 12 show such a power steering device.

Figure 9:
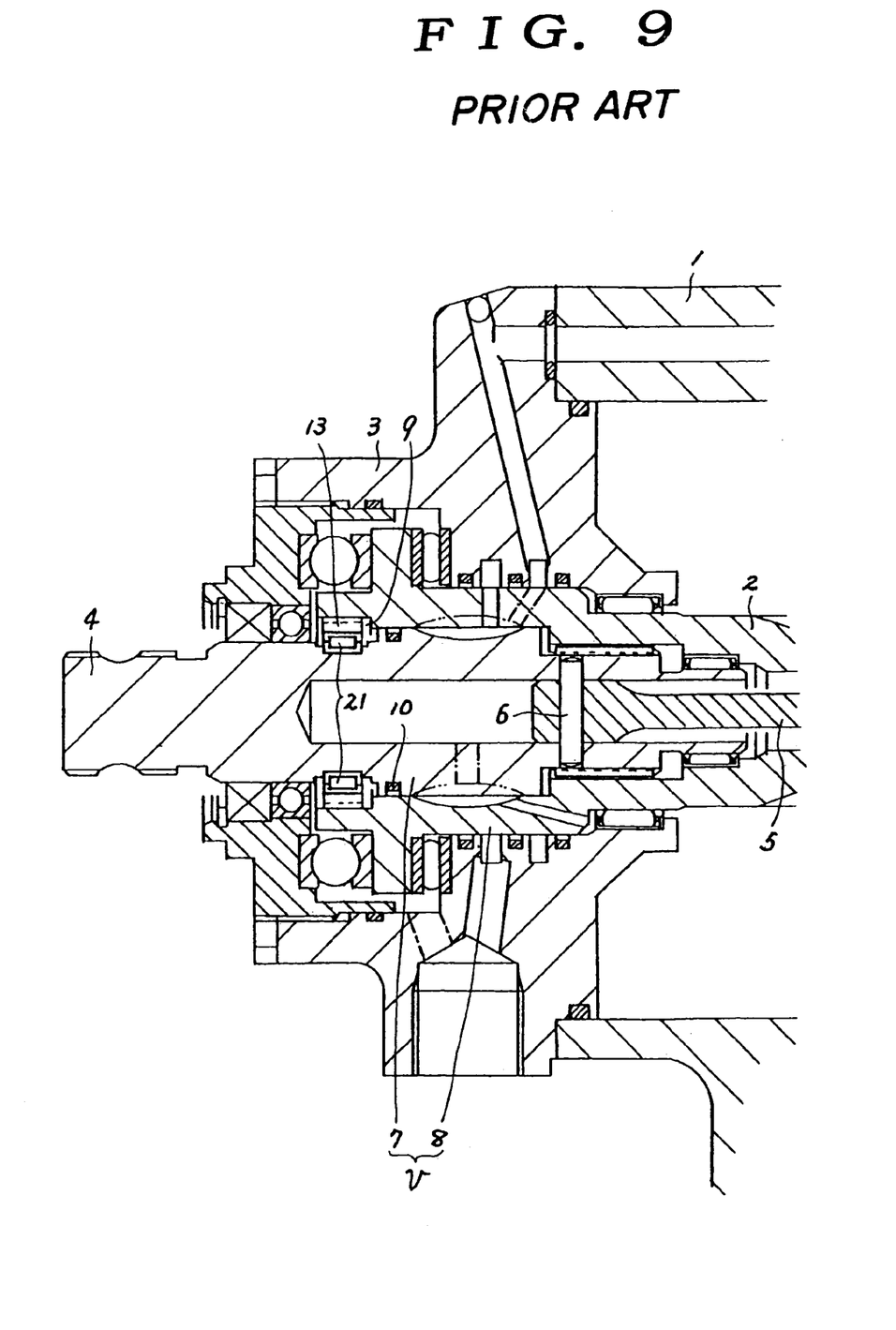
FIG. 9 is a sectional view of a conventional hydraulic pressure type power steering device.

In this device, a power cylinder 1 incorporates a piston (not shown) through which an output shaft 2 is penetrated. The piston and the output shaft 2 are linked through a ball nut which is not shown.

Further, a sector gear which is not shown is engaged with the piston to be rotated as the piston moves. The rotation of the sector gear causes a steering wheel linked therewith to turn. This is a so-called integral type power steering device.

A valve case 3 is secured to the power cylinder 1. The base end of the output shaft 2 is rotatably supported by the valve case 3.

The output shaft 2 is hollow, and an end of an input shaft 4 is rotatably inserted therein in a position toward the base end thereof.

The input shaft 4 and output shaft 2 are linked through a torsion bar 5. Specifically, one end of the torsion bar 5 is inserted in the input shaft 4 and secured thereto by a pin 6 that is pierced through the portion where it is inserted. The other end of the torsion bar 5 is secured to the output shaft 2 by a pin which is not shown.

The input shaft 4 and output shaft 2 rotate relative to each other while twisting the torsion bar 5.

A rotary spool 7 is formed to be integral with an outer circumferential surface of the input shaft 4 inserted in the output shaft 2. An inner circumferential surface of the output shaft 2 that faces the rotary spool 7 serves as a rotary sleeve 8. The rotary spool 7 and rotary sleeve 8 are fitted to each other such that they can rotate relative to each other to form a steering valve v.

When the input shaft 4 and output shaft 2 rotate relative to each other, the steering valve v is switched in accordance with the rotating direction to supply operating fluid into one of pressure chambers defined in the power cylinder 1 and to discharge operating fluid in the other pressure chamber to a tank. As a result, the piston moves to rotate the sector gear, thereby applying an assistant force to the wheels linked thereto.

In a power steering device having such a configuration, a spring containing chamber 9 is formed on one end of the output shaft 2 and is blocked from the steering valve v by a seal member 10.

Figure 10:
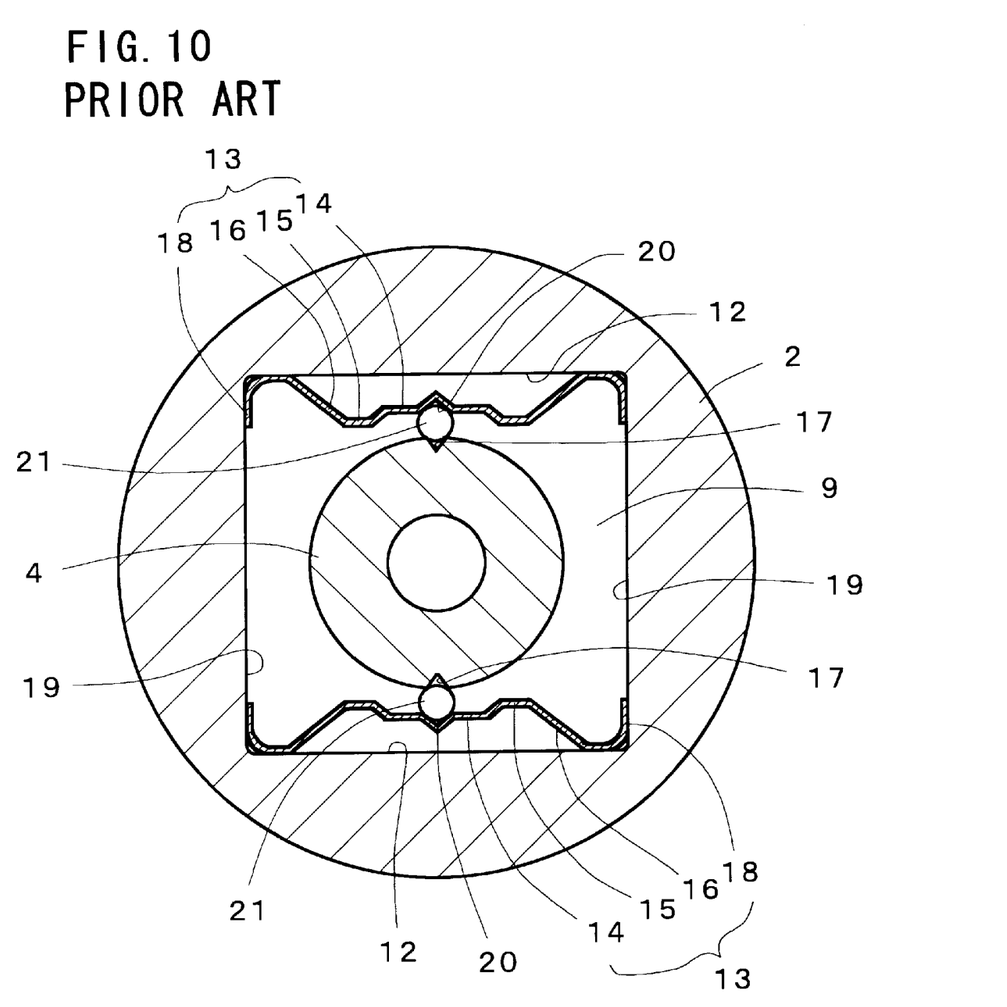
FIG. 10 is a sectional view of the spring containing chamber 9 of the power steering device shown in FIG. 9.

As shown in FIG. 10, the spring containing chamber 9 is substantially in the form of a square surrounded by walls 12, 12 and walls 19, 19 formed by boring the end of the output shaft 2.

The input shaft 4 is inserted in the spring containing chamber 9 in which a pair of spring members 13 are disposed such that they sandwich the input shaft 4, and balls or rollers 21 are interposed between the spring members 13 and the input shaft 4.

A pair of first support grooves 17 are formed in opposite positions on the outer circumferential surface of the input shaft 4. The first support grooves 17 are arranged such that they face the walls 12 of the spring containing chamber 9 to maintain the state shown in FIG. 10 in the neutral state wherein the input shaft 4 and output shaft 2 are not in relative rotation.

Figure 12:
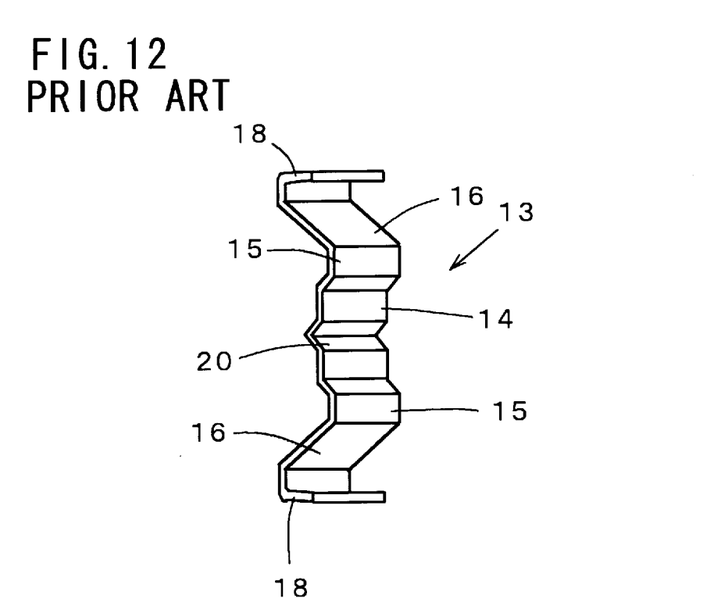
FIG. 12 is a perspective view of a flat spring as a spring member 13.

As shown in FIG. 12, the spring member 13 is constituted by a flat spring having a flat portion 14, convex portions 15 formed on both sides of the flat portion 14 and slopes 16 continuous with the convex portions 15.

A second support groove 20 which is a V- or U-shaped groove is formed in the middle of the flat portion 14. Further, the ends of both of the slopes 16 are bent to form anchoring portions 18.

The convex portions 15 serve as stoppers to prevent the ball or roller 21 from dropping from the gap between the spring member 13 and input shaft 4 when it comes out the first and second support grooves 17 and 20.

When the spring member 13 is in a free state, the distance between the anchoring portions 18, 18 on both sides thereof is longer than the distance between the walls 19, 19 of the spring containing chamber 9.

Thus, as shown in FIG. 9, when the spring members 13 are placed in the spring containing chamber 9, it is anchored thereto by the anchoring portions 18 being urged into contact with the walls 12 and the walls 19 which are normal to the walls 12 at the corners of the spring containing chamber 9.

The first support grooves 17 are put in a face-to-face relationship with the second support grooves 20 on the spring members 13 in the neutral state wherein the input shaft 4 and output shaft 2 are not in relative rotation. When the spring members 13 are anchored as described above, the distance between the first support grooves 17 and the second support grooves 20 is smaller than that in the state wherein the balls or rollers 21 are interposed therebetween.

When the balls or rollers 21 are interposed between the first and second support grooves 17 and 20, a spring force acts in the direction toward the center of the input shaft 4 to appear as an initial load. The first and second support grooves 17 and 20 are both formed to a small depth that only supports the balls or rollers 21 therein rather than holding them securely.

The operation of this power steering device will now be described.

When the steering wheel is kept in the neutral position, the input shaft 4 and output shaft 2 are in the neutral position shown in FIG. 10. The initial load from the spring members 13 is exerted to the input shaft 4 in the direction of sandwiching the input shaft 4 to act as a preset force through the balls or rollers 21.

Thus, rigidity of the neutral position can be improved to provide stability during a straight travel.

Let us assume that the steering wheel is turned in this state to rotate the input shaft 4 in the direction indicated by the arrow k relative to the output shaft 2.

Figure 11:
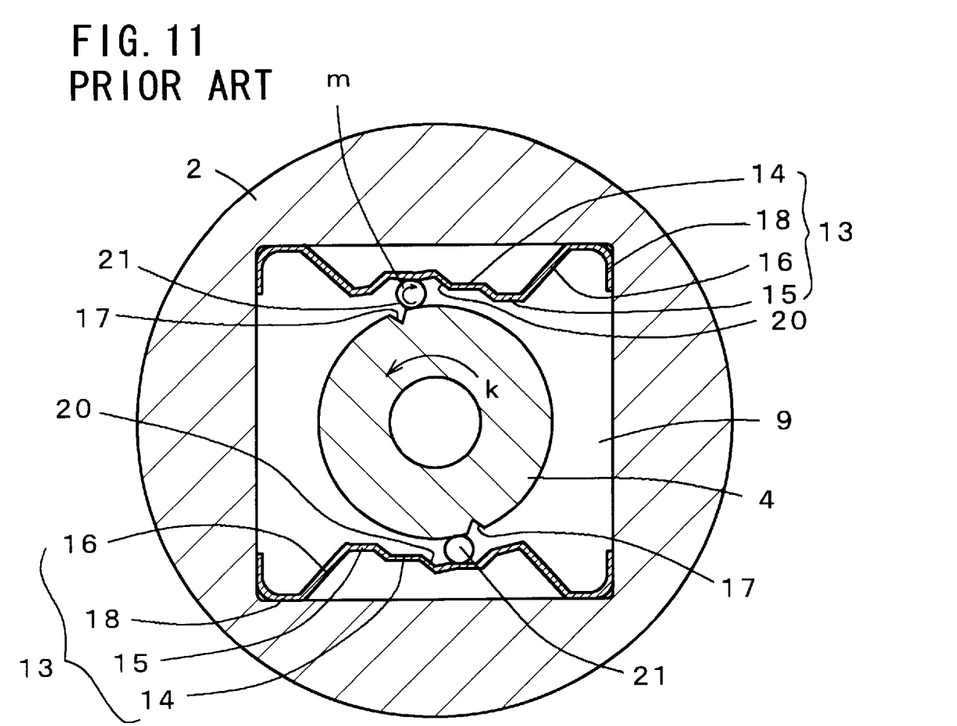
FIG. 11 is a sectional view showing a state realized when the input shaft 4 and output shaft 2 in FIG. 10 have rotated relative to each other.

Then, as shown in FIG. 11, the balls or rollers 21 move over the edges of the supporting grooves 17 and 20 while deflecting the spring members 13 to ride on circumferential portions of the input shaft 4.

Further relative rotation of the input shaft 4 and output shaft 2 causes the balls or rollers 21 to move between the flat portions 14 of the spring members 13 and the circumferential portions of the input shaft 4 in the direction indicated by m in a rolling motion with the spring members 13 kept deflected.

Thus, the steering reaction force generated at this time is a combination of the torsional resistance of the torsion bar 5 and the spring force of the spring members 13.

When the input shaft 4 and output shaft 2 have rotated relative to each other by predetermined amounts, the balls or rollers 21 contact the convex portions 15 of the spring members 13. Therefore, the balls or rollers 21 will not come out from the gap between the flat portions 14 of the spring members 13 and the input shaft 4.

As described above, the relative rotation of the input shaft 4 and output shaft 2 switches the steering valve v to control the operating fluid in to the power cylinder 1, thereby providing an assistant force. When the wheels is steered to a target value as a result of the application of the assistant force, the input shaft 4 and output shaft 2 return the neutral position. At this time, the balls or rollers 21 also roll to return to the positions of the support grooves 17 and 20 and thus they return to the neutral state shown in FIG. 10.

Figure 13:
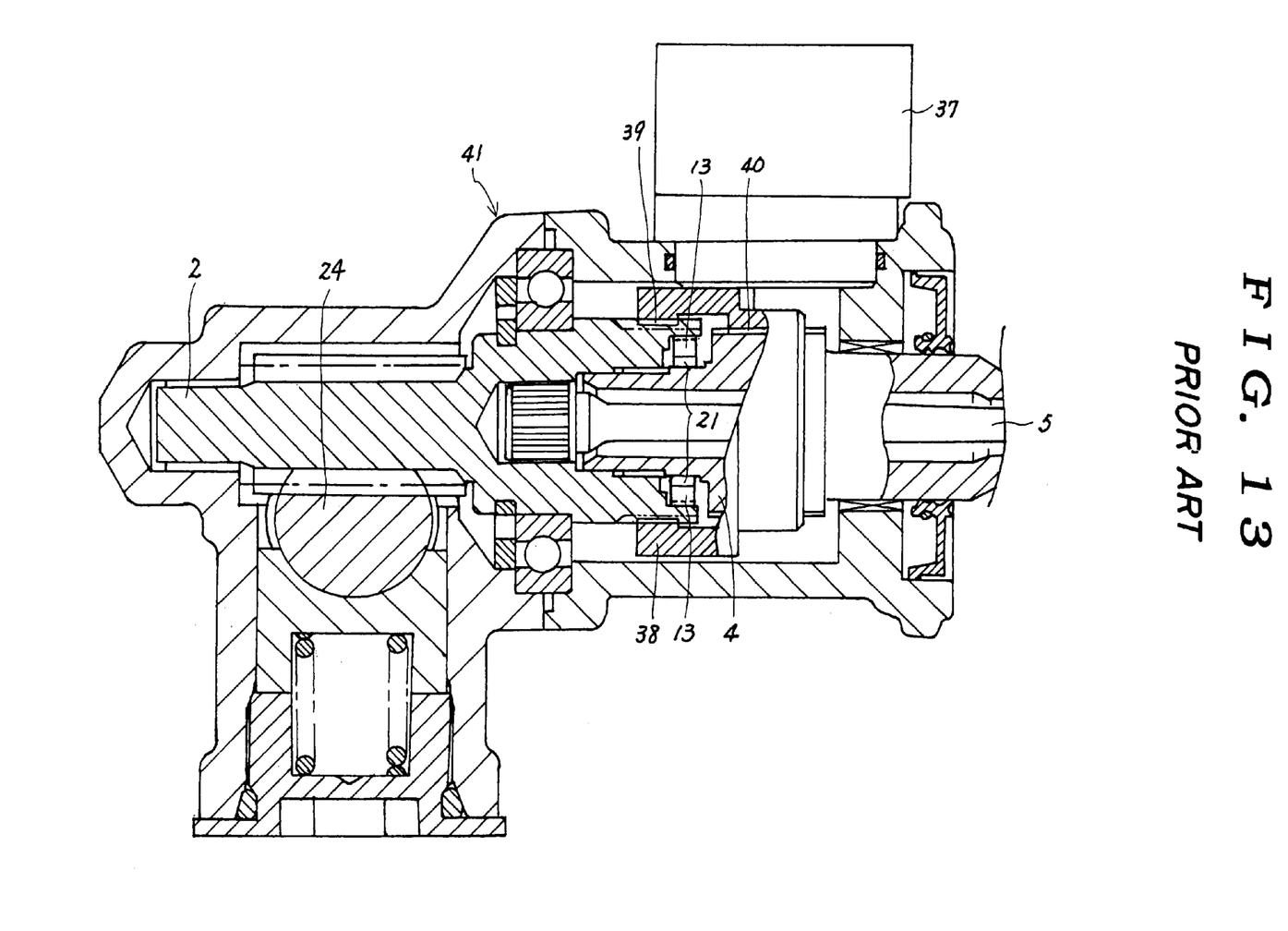
FIG. 13 is a sectional view of another conventional power steering device of electric type.

Such a mechanism for applying a preset force may be provided not only on a hydraulic power steering device described above but also on an electric power steering device as shown in FIG. 13.

This device provides an assistant force from an electric motor which is not shown in accordance with the relative rotation of an input shaft 4 and an output shaft 2 incorporated in a housing 41. The magnitude of the relative rotation is detected as the direction and magnitude of the input torque based on which a signal is sent to the electric motor.

It has a mechanism in which the relative rotation of the input shaft 4 and output shaft 2 moves a slider 38 provided on the outer circumference of the input shaft 4 and output shaft 2 in the axial direction thereof, and a torque sensor 37 detects the input torque from the amount of the movement. The slider 38 is coupled to the output shaft 2 by a screw portion 39 and is connected to the input shaft 4 by a spline 40. Therefore, the movement of the slider 38 is suppressed in the rotating direction of the input shaft 4 and is allowed only in the axial direction of the same.

Thus, when the input shaft 4 rotates relative to the output shaft 2, the slider 38 moves in the axial direction thereof.

This device is the same as the device shown in FIG. 9 in that it has a configuration in which a preset force is provided by spring members 13 provided in a spring containing chamber 9 formed at an end of the output shaft 2 such that they sandwich the input shaft 4.

The above-described power steering device can improve rigidity of neutrality by applying a preset force to provide stability of a vehicle during a straight travel.

The balance of the preset force can be maintained because the preset force is applied by the spring members provided on both sides of the input shaft 4. Thus, the rigidity of neutrality does not vary depending on the direction in which the steering wheel is turned.

In such a device, since the spring containing chamber 9 is formed by boring the end of the output shaft 2, the output shaft 2 and the spring containing chamber 9 move integrally.

Thus, when the centering of the output shaft 2 and input shaft 4 is carried out to match their relative positions with the steering valve v in a neutral state of the hydraulic pressure, the relative positions of the spring members 13 as a mechanism for applying the preset force and the input shaft 4 are also determined.

Therefore, when the shaft centering to determine the relative positions of the input and output shafts 4 and 2 is carried out in accordance with the neutral position of the steering valve v, the interior of the spring containing chamber 9 must essentially be in the state as shown in FIG. 10. That is, when the centering of the hydraulic pressure has been carried out, the centering of the mechanism for applying the preset force must have been also completed automatically.

However, it is difficult to achieve both of shaft centering and preset force centering properly through a centering operation on only either of them.

In practice, since priority is given to the centering of the shafts, i.e., the centering of the hydraulic pressure, the preset force may become off balance.

For example, if the spring members 13 and the input shaft 4 are initially in the state shown in FIG. 11 as a result of a slip between their relative positions even though the steering valve v is in the neutral state, the rigidity of neutrality can be off balance to be biased to the left or right.

In order to achieve both of shaft centering and preset force centering using the above-described method, strict control must be performed, for example, on the dimensions of each part, the internal dimensions of the spring containing chamber 9, the flatness of walls, and processing and assembling accuracy of the support grooves 20 on the spring members 13 and the support grooves 17 on the input shaft 4. This obviously leads to an increase in the manufacturing cost.

Further, it is again necessary in the electric power steering device shown in FIG. 13 to secure the torsion bar 5 such that it is not twisted when the output shaft 2 and input shaft 4 are in relative positions adjusted so as to match the axial position of the slider 38 with a zero point of the torque sensor 35. In this case, again, shaft centering to achieve such relative positions of the output shaft 2 and input shaft 4 also determines the relative positions of the spring members 13 as a preset force application mechanism and the input shaft 4.

Therefore, in order to achieve both of shaft centering and preset force centering, strict control must be again performed, for example, on the dimensions of each part, the internal dimensions of the spring containing chamber 9, the flatness of walls, and processing and assembling accuracy of the support grooves 20 on the spring members 13 and the support grooves 17 on the input shaft 4, which results in the same problem as in the example of a hydraulic pressure type power steering device as described above.

It is an object of the present invention to easily achieve both of the centering of input and output shafts to determine their relative positions in a neutral state and the centering of a mechanism for applying a preset force.

SUMMARY OF THE INVENTION

According to a first aspect of the present invention, there is provided a power steering device comprising a torsion bar connecting an input shaft and an output shaft and having a configuration wherein the input shaft and output shaft are rotated relative to each other with the torsion bar twisted therebetween to provide an assistant force that is in accordance with the amount of the relative rotation; a spring containing chamber is provided which rotates integrally with the output shaft; the input shaft is inserted in the spring containing chamber; and a pair of spring members provided so as to sandwich the input shaft on both sides thereof are put into contact with the input shaft by a pressure to provide a preset force by the spring force thereof.

It is further characterized in that a spring receiving ring is provided which is a member separate from the output shaft or the member that rotates integrally with the output shaft; the spring containing chamber and at least one insertion hole is provided in the spring receiving ring. A securing member is inserted in the insertion hole to position and secure the spring receiving ring to the output shaft or the member rotating integrally with the output shaft; and a fine adjustment means is provided between the securing member and the insertion hole to allow fine adjustment of the positioning of the spring receiving ring relative to the output shaft or the member rotating integrally with the output shaft.

As described above, the spring receiving ring that forms a part of the spring containing chamber is a member separate from the output shaft or the member rotating integrally with the output shaft. Fine adjustment of the position of the spring receiving ring can be performed when the spring receiving ring is secured to the output shaft or the member rotating integrally with the output shaft to center the mechanism for applying a preset force.

According to a second aspect of the invention, there is provided a device according to the first aspect, characterized in that one insertion hole is provided with clearance as a means for fine adjustment that allows the position of the spring receiving ring to be moved only in the radial direction thereof with the securing member inserted in the insertion hole.

The one insertion hole having the clearance to allow movement only in the radial direction limits movement in the rotating direction. As a result, even if other insertion holes are provided with clearance to allow movement in all directions, the spring receiving ring as a whole has a limited degree of freedom in the rotating direction. This prevents looseness from becoming too high to facilitate positioning.

DETAILED DESCRIPTION OF PREFERRED EMBODIMENTS

Figure 1:
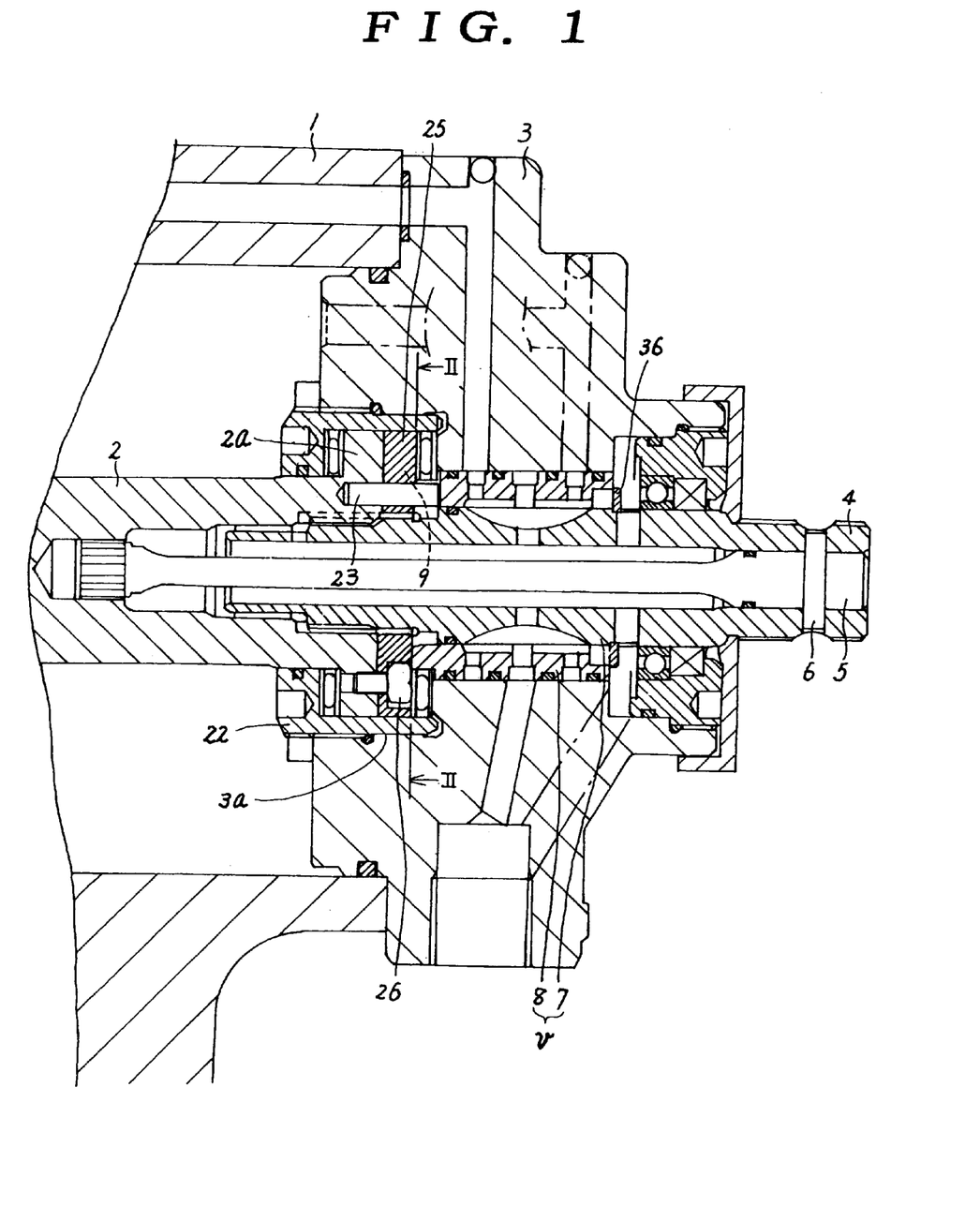
FIG. 1 is a sectional view of a power steering device according to a first embodiment of the present invention.
Figure 2:
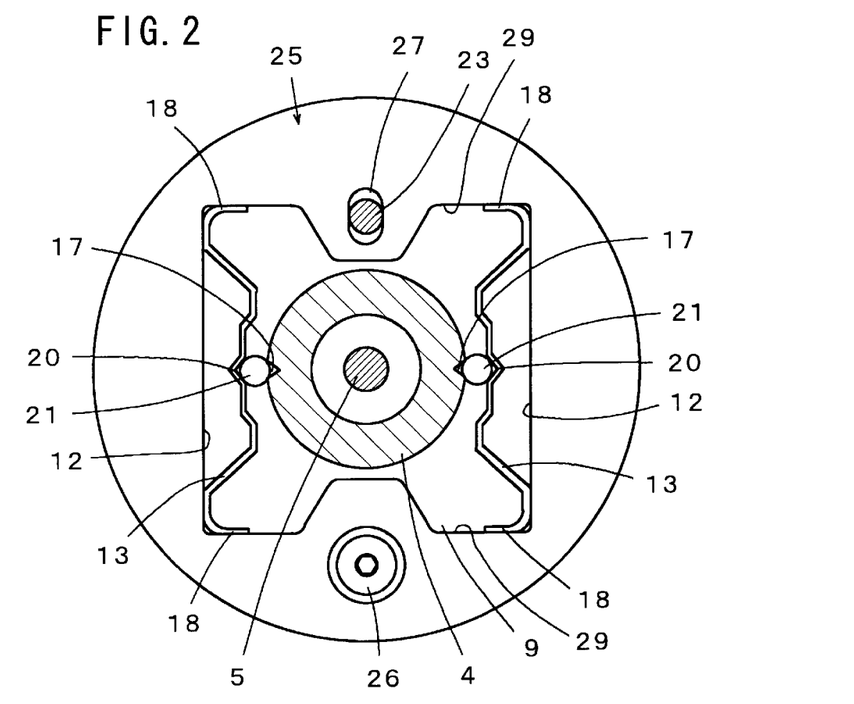
FIG. 2 is a sectional view taken along the line II—II in FIG. 1.
Figure 3:
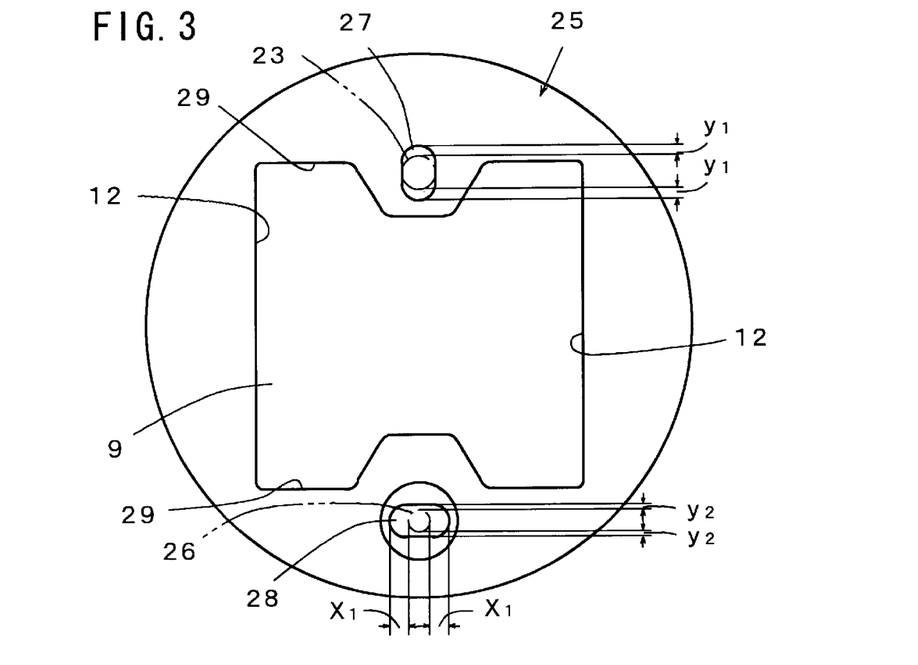
FIG. 3 is a front view of the spring receiving ring in the first embodiment.

In a first embodiment of the present invention shown in FIGS. 1 through 3, a spring receiving ring 25 is secured to a major diameter portion 2a of an output shaft 2 connected to an input shaft 4 through a torsion bar 5.

The power steering device shown in FIG. 1 is different from those according to the prior art in that the output shaft 2 is separate from a rotary sleeve 8.

The major diameter portion 2a is inserted in a step portion 3a of a valve case 3 and secured thereto with a cylindrical member 22. The cylindrical member 22 is screwed into the step portion 3a of the valve case 3 from the side of the power cylinder 1 to be secured thereto.

A configuration similar to that in the prior art is employed in which the input shaft 4 and output shaft 2 are rotated relative to each other to switch a steering valve v, thereby providing an assistant force. Therefore, members having like functions are referred to by like reference numbers.

As shown in FIGS. 2 and 3, a spring containing chamber 9 defines a space surrounded by flat walls 12, 12 and walls 29 which inwardly protrude in regions where a pin 23 as a securing member and an insertion hole for a bolt 26 are formed.

The input shaft 4 is inserted into the spring containing chamber 9 in the middle thereof. A pair of spring members 13 similar to those according to the prior art shown in FIG. 12 are provided on the walls 12 in a face-to-face relationship. Balls or rollers 21 are interposed between the spring members 13 and the outer circumference of the input shaft 4.

First support grooves 17 are formed on the outer circumference of the input shaft 4 such that they face second support grooves 20 on the spring members 13, 13 in a neutral position.

Such a mechanism for applying a preset force applies a preset force utilizing a spring force through the same operation as in the prior art and therefore will not be described here.

As shown in FIGS. 1 and 2, the spring receiving ring 25 is secured to the major diameter portion 2a of the output shaft 2 with the pin 23 and the bolt 26. The pin 23 extends through the spring receiving ring 25 to be also inserted in a notch formed on the rotary sleeve 8, thereby providing another function of linking the rotary sleeve 8 and the output shaft 2.

Further, as shown in FIG. 3, a pin hole 27 and a bolt hole 28 in which the pin 23 and the bolt 26 are respectively inserted are formed as slots.

The pin hole 27 is a slot which is longer in the radial direction of the spring receiving ring 25 and which has a clearance $Y_1$ relative to the pin 23 only in the vertical direction.

Meanwhile, the bolt hole 28 is a slot which is longer in the horizontal direction to be in a perpendicular relationship with the pin hole 27 and which has clearances $x_1$ and $y_2$ in the horizontal and vertical directions, respectively, although the vertical clearance $y_2$ is very small.

In operation, the pin hole 27 only permits movement of the spring receiving ring 25 in the radial direction, i.e. in the direction of the orientation of the slot, while the pin 23 is being inserted into the pin hole 27. Meanwhile, the bolt hole 28 permits movement of the spring receiving ring 25 in any direction, i.e. in both a radial and tangential direction, while the bolt 26 is being inserted into the bolt hole 28. In this manner, the spring receiving ring 25 can be finely adjusted with respect to the major diameter portion 2a of the output shaft 2.

A description will now be made on how to mount such a spring receiving ring 25.

First, the pin 23 secured to the major diameter portion 2a of the output shaft 2 is inserted in the pin hole 27 of the spring receiving ring 25 prior to assembly into the valve case 3. Then, the spring receiving ring 25 is temporarily secured to the major diameter portion 2a of the output shaft 2 with the bolt 26.

At this point, the torsion bar 5 and the input shaft 4 have been inserted in the output shaft 2. While one end of the torsion bar 5 is secured to the output shaft 2, the other end is free from the input shaft 4.

Then, as shown in FIG. 2, the spring members 13 are mounted in the spring containing chamber 9, and the balls or rollers 21 are interposed between the spring members 13 and the input shaft 4. In this state, the spring receiving ring 25 can move in the vertical, horizontal and rotating directions.

Thereafter, the rotary sleeve 8 is attached to the output shaft 2 through the pin 23 and is secured thereto with a snap ring 36 (see FIG. 1).

The resultant component obtained by assembling and integrating only the input and output shafts 4 and 2, the torsion bar 5 and the steering valve v is assembled into a shaft centering jig.

This shaft centering jig is a jig which is capable of adjusting the neutral position of the steering valve v while maintaining the above-described integrated component in the assembled state.

The input shaft 4 and output shaft 2 are rotated relative to each other with the integrated component inserted in the jig and, when the neutrality of the steering valve v is achieved, the torsion bar 5 is formed with a hole into which a pin 6 is inserted by force. Thus, the torsion bar 5 is coupled to the input shaft 4 in an untwisted state to terminate the shaft centering.

Next, the integrated component is removed from the shaft centering jig, and the sleeve 8 is temporarily removed from the output shaft 2. Then, the centering of the mechanism for applying a preset force is carried out.

The clearances of the pin hole 27 and the bolt hole 28 allow the spring receiving ring 25 to move relative to the output shaft 2. The spring receiving ring 25 is moved in the vertical, horizontal and rotating directions about the pin 23 as a supporting point to find a position where the balls or rollers 21 settle between the second supporting grooves 20 and the first supporting grooves 17. Such a point serves as the center of the mechanism for applying a preset force. Then, the spring receiving ring 25 is secured to the output shaft 2 with the bolt 26.

Thereafter, the rotary sleeve 8 is secured again to the output shaft 2.

At this point, the relationship between the input shaft 4, a rotary spool 7 and the output shaft 2 has been determined by the shaft centering described above. The positional relationship between the output shaft 2 and the rotary sleeve 8 is determined by the pin 23 and does not change when the rotary sleeve 8 is reattached.

Therefore, the re-attachment of the rotary sleeve 8 will not affect the relationship between the rotary sleeve 8 and the rotary spool 7. That is, no error is introduced in the centering of the shafts.

The resultant component assembled and integrated in such a state is assembled into the valve case 3 and secured thereto with a cylindrical member 22.

Finally, the resultant component is assembled into the power cylinder 1, and the neutrality of the cylinder is adjusted and fixed.

As described above, both of the shaft centering and the centering of the preset force application mechanism can be achieved by performing those centering operations separately in accordance with the neutral position of the valve.

In the first embodiment of the invention, since the clearance $y_1$ of the pin hole 27 is provided only in the vertical direction, the pin 27 can not move in the rotating direction. Since one of the pin holes, i.e., pinhole 27, provides a limited degree of freedom, the center position can be easily determined.

For example, if both of the pin hole 27 and pin hole 28 have clearances in all directions, the spring receiving ring 25 will have a too high degree of freedom to move, which unintendedly makes the centering difficult and can result in a prolonged adjusting time. For the same reason, it is preferable that the clearance of the bolt 28 is not larger than required.

Figure 4:
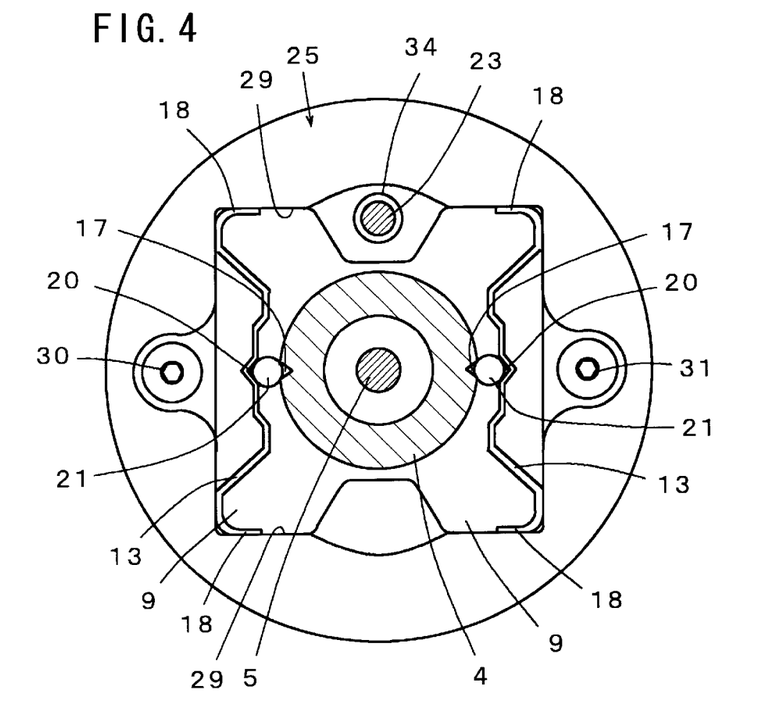
FIG. 4 is a sectional view of the region of a spring receiving ring in a second embodiment of the present invention corresponding to FIG. 2.
Figure 5:
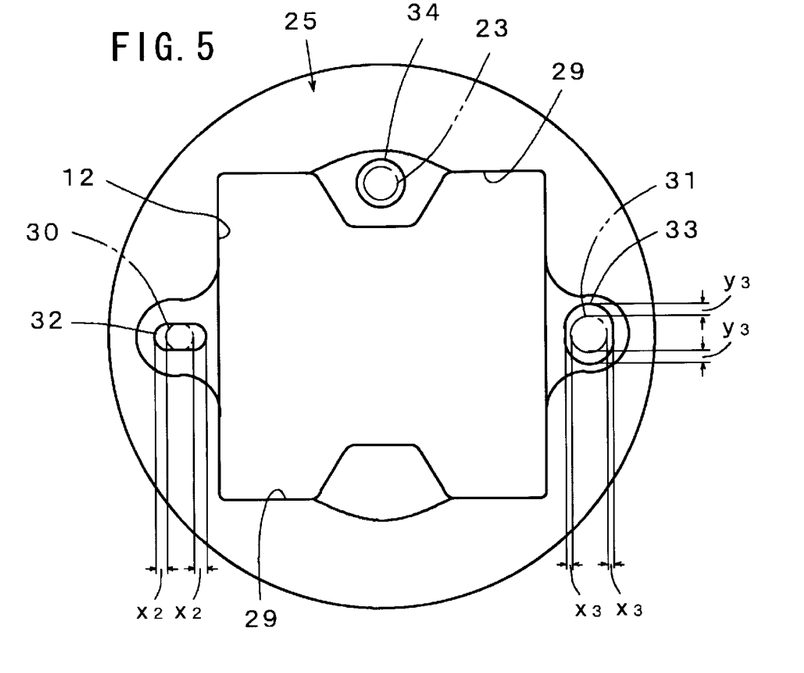
FIG. 5 is a front view of the spring receiving ring in the second embodiment.

The second embodiment of the invention shown in FIGS. 4 and 5 is an embodiment wherein a spring receiving ring 25 is secured to an output shaft 2 using two bolts.

The spring receiving ring 25 is secured to a major diameter portion 2a of the output shaft 2 with left and right bolts 30, 31 as shown in FIG. 4. Bolt holes 32, 33 which are insertion holes for the bolts 30, 31 are slots as shown in FIG. 5.

The bolt hole 32 has a clearance $x_2$ only in the horizontal direction, i.e., the radial direction.

The bolt hole 33 is a vertically extending slot which is in a perpendicular direction with the bolt hole 32 and which has a clearance $y_3$ in the vertical direction and a clearance $X_3$ in the horizontal direction. Thus, the bolt hole 33 has freedom to move in the vertical, horizontal and rotating directions relative to the bolt 31.

In operation, the bolt hole 32 only permits movement of the spring receiving ring 25 in the radial direction, i.e. in the direction of the orientation of the slot, while the bolt 30 is being inserted into the bolt hole 32. Meanwhile, the bolt hole 33 permits movement of the spring receiving ring 25 in any direction, i.e. in both a radial and tangential direction, while the bolt 31 is being inserted into the bolt hole 33. In this manner, the spring receiving ring 25 can be finely adjusted with respect to the major diameter portion 2a of the output shaft.

A pin hole 34 is an unloaded hole which is larger in diameter than the pin 23. Therefore, when a sleeve 8 and the output shaft 2 are linked, the pin 23 only extends through the pin hole 34 and does not contribute to the positioning of the spring receiving ring 25.

Such a spring receiving ring 25 can be assembled as in the first embodiment to achieve both of the shaft centering and the centering of the preset force application mechanism.

Further, the second embodiment of the invention also facilitates centering because the clearance $x_3$ of one of the bolt holes, i.e., the bolt hole 33, is provided only in the radial direction to eliminate freedom in the rotating direction.

Although the spring receiving ring 25 is directly secured to an end of the output shaft 2 in the first and second embodiments, the spring receiving ring 25 may be secured to another member that rotates integrally with the output shaft 2.

Figure 6:
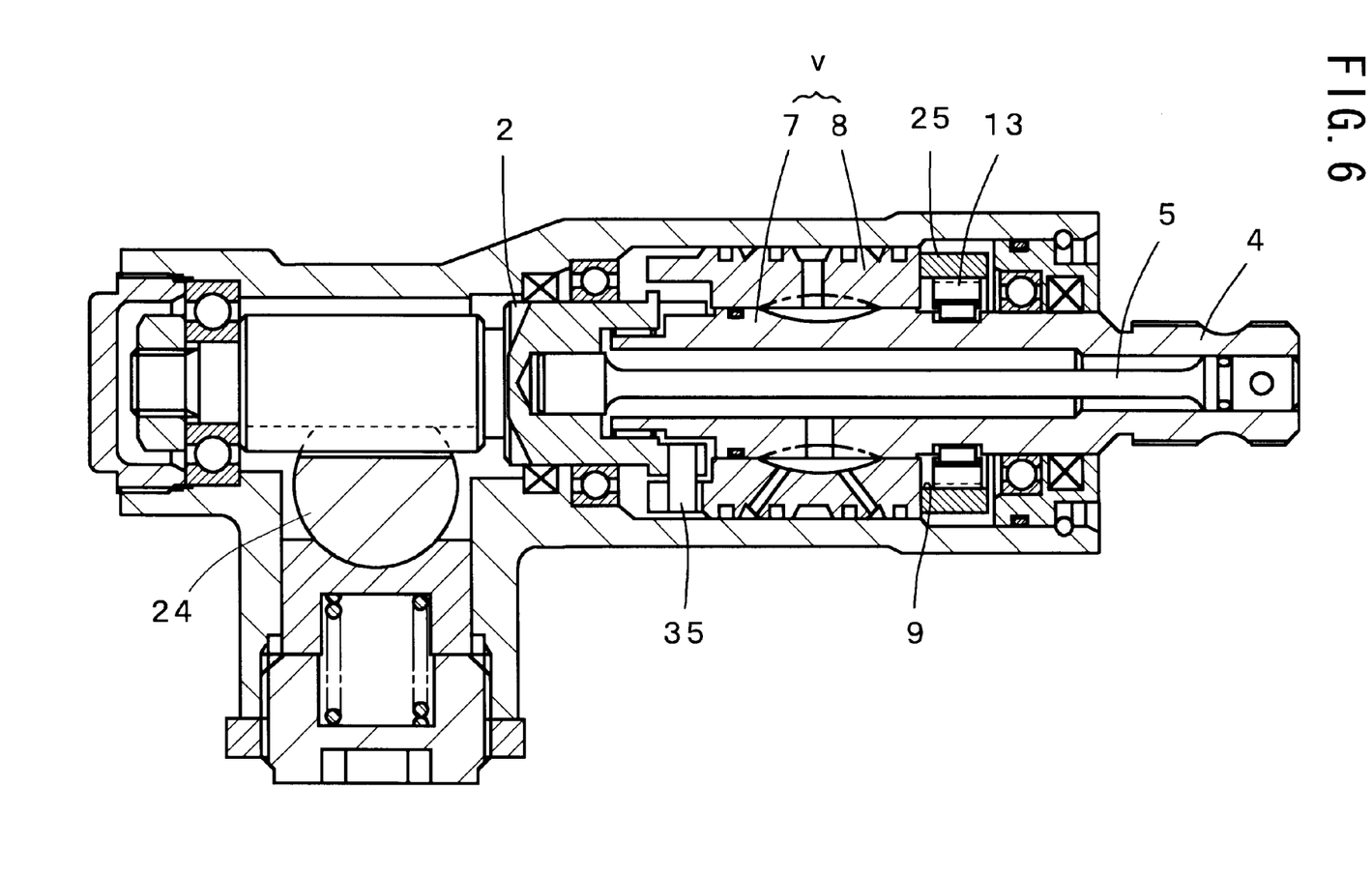
FIG. 6 is a sectional view of a power steering device according to a third embodiment of the present invention showing an example wherein a spring receiving ring 25 is provided on a rotary sleeve 8.

For example, in a rack-and-pinion type power steering device according to a third embodiment of the invention shown in FIG. 6, a rotary sleeve 8 is connected to an output shaft 2 linked to a steering rod 24 through a pin 35. A spring receiving ring 25 is secured to the rotary sleeve 8 which is a member rotating integrally with the output shaft 2 instead of the output shaft 2 itself. The present embodiment is the same as the above-described embodiments in that a preset force is applied to an input shaft 4 provided therein by spring members 13.

Figure 7:
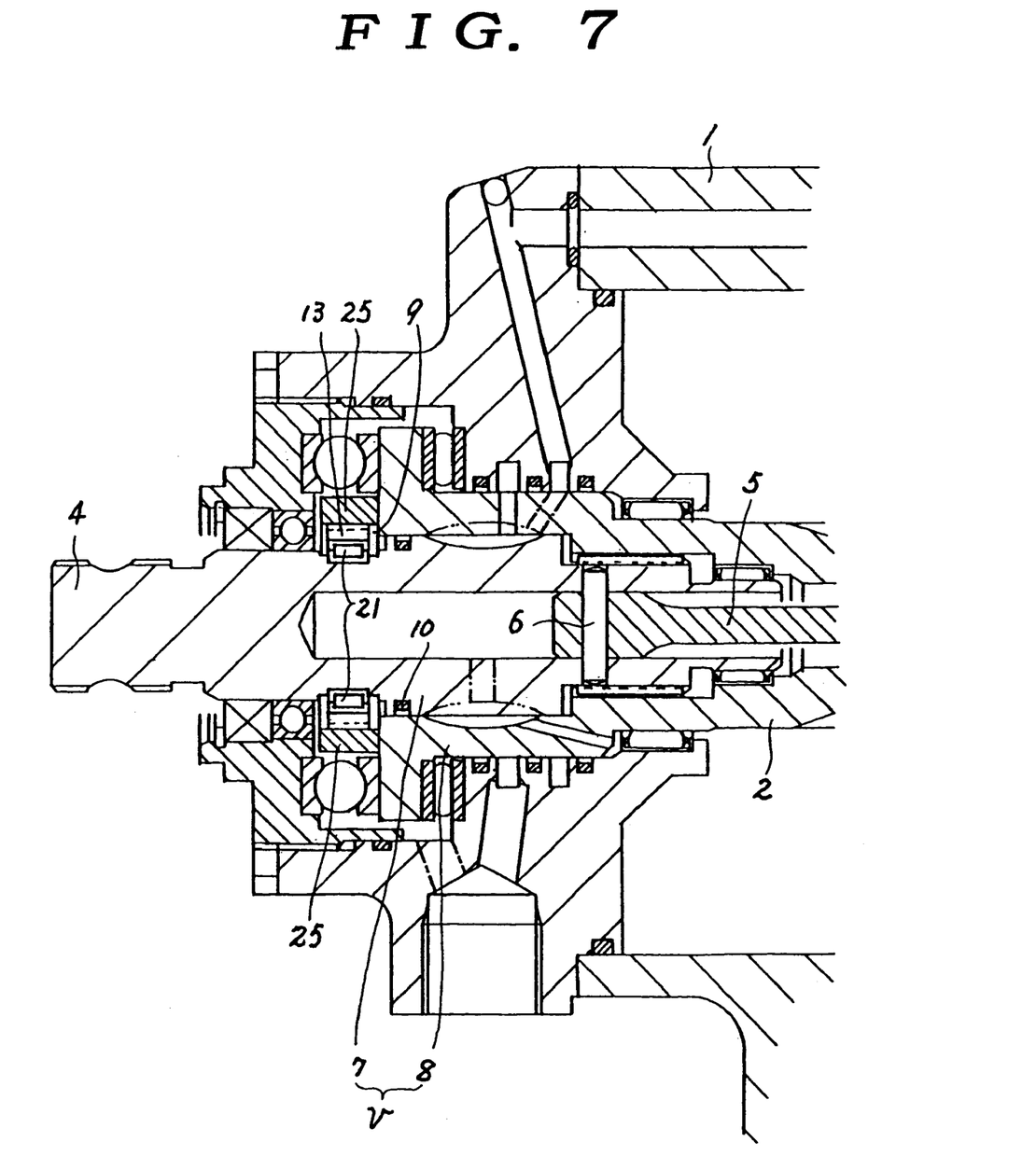
FIG. 7 is a sectional view of a power steering device according to a fourth embodiment of the present invention showing an example wherein a spring receiving ring 25 is provided on a major diameter portion of an output shaft 2.

Alternatively, according to a fourth embodiment shown in FIG. 7, a spring receiving ring 25 is secured to a major diameter portion of an output shaft 2 having a rotary sleeve 8 integrally formed thereon. In this fourth embodiment, an end of the output shaft 2 is replaced with a spring receiving ring 25 unlike the prior art.

Further, a mechanism for applying a preset force including a spring receiving ring 25 as described above may be mounted in an electric power steering device.

Figure 8:
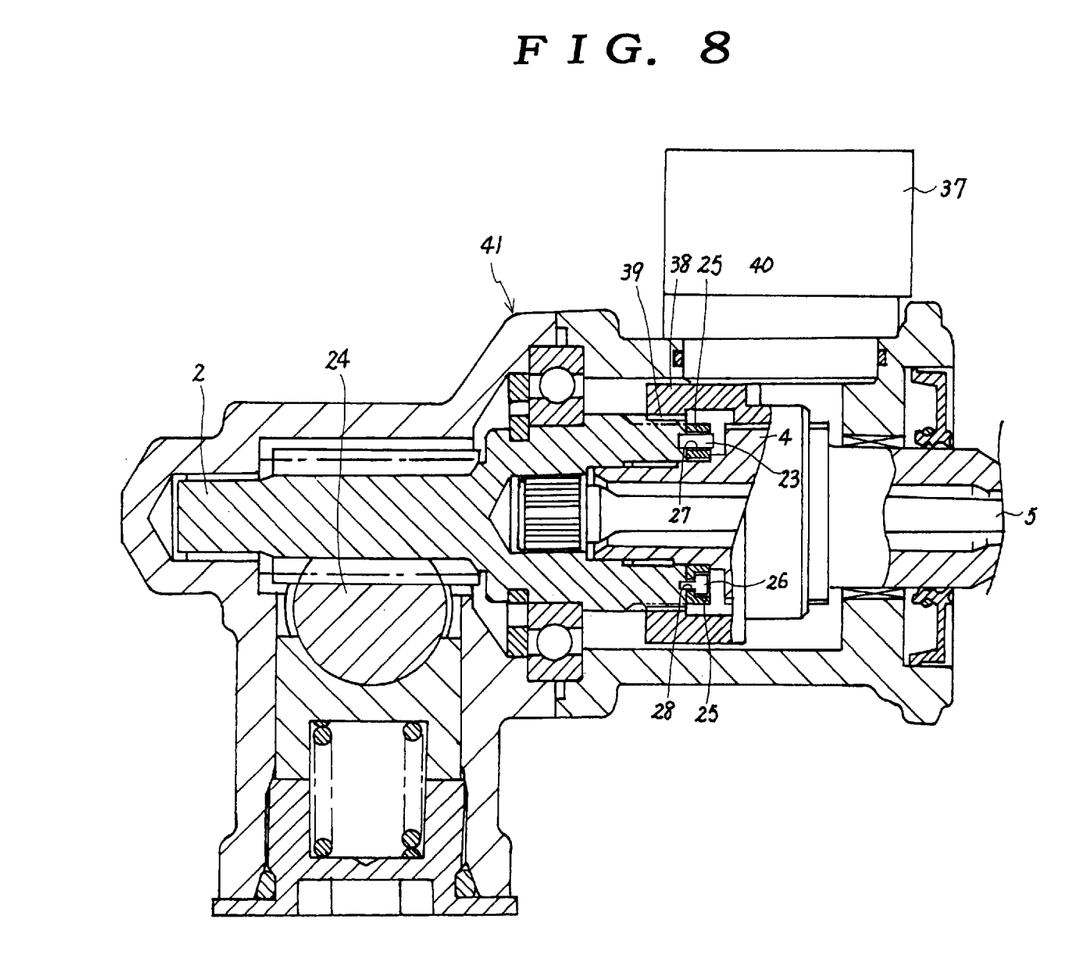
FIG. 8 is a sectional view of a power steering device according to a fifth embodiment of the present invention showing an example wherein a spring receiving ring 25 is provided on an end of an output shaft 2.

For example, the fifth embodiment of the invention shown in FIG. 8 is an electric power steering device in which a spring receiving ring 25 as shown in FIGS. 2 and 3 is provided on an end of an output shaft 2 to configure a mechanism for applying a present force. A spring receiving ring 25 as shown in FIG. 3 is secured by a pin 23 and a bolt 26 secured to the end of the output shaft 2 to provide a configuration as shown in FIGS. 2 and 8.

It is different from the conventional electric power steering device shown in FIG. 13 in that the spring receiving ring 25 is mounted on the output shaft 2 instead of forming a spring containing chamber directly thereon. Its configuration in other aspects and the characteristics of the mechanism for applying a present force are the same as those of the example of the prior art shown in FIG. 13 and will not be described here.

However, since spring members 13 in the fifth embodiment are provided in positions about an input shaft 4 shifted from the spring members 13 of the device shown in FIG. 13 by 90 degrees, no spring member 13 does not appear in the sectional view in FIG. 8.

A description will now be made on a method of centering the shafts and the preset force application mechanism in the fifth embodiment of the invention.

First, the pin 23 secured to end of the output shaft 2 is inserted in a pin hole 27 of the spring receiving ring 25 prior to assembly into a housing 41. Then, the spring receiving ring 25 is temporarily secured to the output shaft 2 with the bolt 26 inserted in a bolt hole 28 (see FIGS. 2 and 8).

At this point, a torsion bar 5 and the input shaft 4 have been inserted in the output shaft 2. While one end of the torsion bar 5 is secured to the output shaft 2, the other end is free from the input shaft 4.

Then, as shown in FIG. 2, the spring members 13 are mounted in a spring containing chamber 9, and balls or rollers 21 are interposed between the spring members 13 and the input shaft 4. In this state, the spring receiving ring 25 can move in the vertical, horizontal and rotating directions.

Thereafter, a rotary sleeve 8 is coupled to a spline 40 and engaged with a threaded portion 39 and then the input shaft 4 is rotated relative to the output shaft 2. Since the slider 38 moves toward the output shaft 2 in the axial direction in a rotating motion along the threaded portion 39, the slider 38 is assembled on to the outer circumference of the output shaft 2.

The resultant component obtained by assembling and integrating only the input and output shafts 4 and 2, the torsion bar 5 and the slider 38 is assembled into a shaft centering jig which is prepared separately.

This shaft centering jig is a jig which is capable of adjusting the neutral position of the slider 38 t a zero point of a torque sensor that detects torque in accordance with the amount of the relative rotation of the input and output shafts 4, 2. The position of the slider 38 can be adjusted with the above-described integrated component maintained in the assembled state.

When the input shaft 4 and output shaft 2 are rotated relative to each other with the integrated component inserted in the jig, the slider 38 moves in the axial direction. When the neutral position of slider 38 is thus determined, a hole is formed on the other end of the torsion bar 5 to couple it with the input shaft 4 using a pin which is not shown. Thus, the torsion bar 5 is coupled to the input shaft 4 in an untwisted state to terminate the shaft centering.

Next, the integrated component is removed from the shaft centering jig.

Then, the slider 38 is temporarily removed from the output shaft 2 after fixing one end of the output shaft 2 with a jig for fixing the output shaft which is separate from that described above. To remove the slider 38 from the output shaft 2, the slider 38 is rotated in the direction opposite to the direction in which it was assembled on to the output shaft 2. The slider 38 moves toward the input shaft 4 in a rotating motion along the threaded portion 39 to come off the output shaft 2. Such rotation of the slider 38 is accompanied by rotation of the input shaft 4 which twists the torsion bar 5.

When the slider 38 is removed, the torsion bar 5 returns from the twisted state, and the input shaft 4 also returns to the initial neutral state (FIG. 8).

In this state, the centering of the mechanism for applying a present force will now be performed.

Specifically, the spring receiving ring 25 is secured to the output shaft 2 with the bolt 26 after fine adjustment of the position thereof.

The fine adjustment of the position of the spring receiving ring 25, i.e., the centering of the mechanism for applying a preset force is the same as that in the first embodiment and therefore will not be described here.

Thereafter, the following steps are carried out to recouple the slider 38 to the output shaft 2 to return the shafts to the neutral position.

First, in the state wherein the slider 38 is removed, the torsion bar 5 is twisted to engage the slider 38 with the threaded portion 39 of the output shaft 2. Then, the slider 38 is rotated along the threaded portion 39, so that the slider 38 moves toward the output shaft 2. The rotating direction of the slider 38 and the input shaft 4 at this time is opposite to the direction in which the slider 38 was removed from the output shaft 2. Therefore, the torsion bar 5 returns from the twisted state as the slider 38 moves toward the output shaft 2. When the twist of the torsion bar 5 is eliminated as a result of the rotation of the input shaft 4, the slider 38 also returns to the centered position of the shafts to which it has been adjusted previously.

This terminates the centering of the shafts and the preset force application mechanism, and the integrated component is assembled into the housing 41 to complete the device.

Although the spring containing chamber 9 in the first through fifth embodiments has a configuration including the flat walls 12 and the walls 29 for supporting the anchoring portions 18 of the springs, the present invention is not limited to such a configuration and other configuration such as a circular configuration may be employed. The anchoring portions 18 of the spring members 13 may be modified in accordance with the configuration of the spring containing chamber 9.

Further, it is not essential that the spring members 13 are flat springs and that the rolls or rollers 21 are interposed between the input shaft 4 and the spring members 13.

In other words, any configuration may be wherein the outer circumference of the input shaft is sandwiched by the spring members on both sides thereof in a neutral state to provide rigidity of neutrality balanced in the lateral direction.

However, when the input shaft is urged by the spring members through the balls or rollers as in the first through fifth embodiments, the friction between the input shaft 4 and output shaft 2 during relative rotation thereof can be reduced by the balls or rollers 21 that move in the gap between the spring members 13 and the outer circumference of the input shaft 4 in a rolling motion.

This makes it possible to smooth the characteristics of the input torque of the steering wheel and the amount of the relative rotation of the shafts 2 and 4.

Further, the preset force can be easily adjusted by changing the diameter of the balls or roller 21.

In a power steering device according to the first aspect of the invention, a spring containing chamber is formed in a spring receiving ring which is a member separate from an output shaft or a member that rotates integrally with the output shaft and is secured to the output shaft or the member rotating integrally with the output shaft using a securing member.

The position of the spring receiving ring can be decided by performing fine adjustment of the position with the securing member inserted in an insertion hole provided on the spring receiving ring.

Therefore, the spring receiving ring can be positioned and secured after centering the shafts, which makes it possible to easily achieve both of the centering of a mechanism for applying a preset force and the centering of the shafts.

According to the second aspect of the invention, one of insertion holes on the securing member does not have freedom to move in the rotating direction because it has a clearance that allows the position of the spring receiving ring to be moved only in the radial direction with the securing member inserted therein.

This prevents the spring receiving ring from shaking immoderately without fastening the securing member, thereby facilitating centering.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A power steering device comprising:

a torsion bar connecting an input shaft and an output shaft wherein said input shaft and output shaft are rotated relative to each other so that said torsion bar is twisted to provide an assistant force in accordance with the amount of relative rotation between said input shaft and said output shaft;

a spring receiving ring having a spring containing chamber, said input shaft being inserted within said spring containing chamber, said spring container chamber defining a space surrounded by a plurality of walls;

a pair of spring members arranged within said spring containing chamber such that they sandwich said input shaft on both sides thereof and are placed in contact with said input shaft by pressure to provide a preset force by the springs, each of said spring members having anchoring portions at each end of said spring member, each of said anchoring portions being structured and arranged to press against the walls of said spring containing chamber;

said spring receiving ring further comprising at least one insertion hole;

at least one securing member adapted to be inserted in said insertion hole for positioning and securing said receiving ring to said output shaft; and a fine adjustment means between said at least one securing member and said at least one insertion holes for allowing fine adjustment of the position of said spring receiving ring relative to said output shaft, said fine adjustment means comprising a first clearance is structured and arranged to permit movement of said spring receiving ring in a substantially radial direction while a first securing member is being inserted therein, and said second clearance is structured and arranged to permit movement of said spring receiving ring in substantially any direction while a second securing member is being inserted therein.

2. A power steering device comprising:

a torsion bar connecting an input shaft and an output shaft wherein said input shaft and output shaft are rotated relative to each other so that said torsion bar is twisted to provide an assistant force in accordance with the amount of relative rotation between said input shaft and said output shaft;

a spring receiving ring having a spring containing chamber for receiving said input shaft, said spring container chamber defining a space surrounded by a plurality of walls;

a pair of spring members arranged within said spring receiving chamber such that they sandwich said input shaft on both sides thereof and are placed in contact with said input shaft by pressure to provide a preset force by said spring members, each of said spring members having anchoring portions at each end of said spring member, each of said anchoring portions being structured and arranged to press against the walls of said spring containing chamber;

said spring receiving ring comprising a first and a second slot wherein said first slot is structured and arranged to permit movement of said spring receiving ring in a substantially radial direction while a first securing member is being inserted therein, and said second slot is structured and arranged to permit movement of said spring receiving ring in substantially any direction while a second securing member is being inserted therein.

* * * * *